(12) United States Patent
Esper

(10) Patent No.: US 8,905,694 B2
(45) Date of Patent: Dec. 9, 2014

(54) SELF-LOCKING SCREW

(75) Inventor: Stephan Esper, Neuwied (DE)

(73) Assignee: Ruia Global Fasteners AG, Further Strasse (DE)

( * ) Notice: Subject to any disclaimer, the term of this patent is extended or adjusted under 35 U.S.C. 154(b) by 0 days.

(21) Appl. No.: 13/885,968

(22) PCT Filed: Nov. 24, 2011

(86) PCT No.: PCT/DE2011/050049
§ 371 (c)(1),
(2), (4) Date: May 16, 2013

(87) PCT Pub. No.: WO2012/079569
PCT Pub. Date: Jun. 21, 2012

(65) Prior Publication Data
US 2013/0236266 A1    Sep. 12, 2013

(30) Foreign Application Priority Data
Nov. 26, 2010   (DE) .................... 20 2010 015 839 U

(51) Int. Cl.
*F16B 39/30* (2006.01)
(52) U.S. Cl.
CPC .................................... *F16B 39/30* (2013.01)
USPC ........................................ 411/307; 411/411
(58) Field of Classification Search
USPC ......... 411/259, 272, 307, 310, 311, 411, 417, 411/436–437, 929, 938
See application file for complete search history.

(56) References Cited

U.S. PATENT DOCUMENTS

| | | | | |
|---|---|---|---|---|
| 2,355,486 | A | * | 8/1944 | Tinnerman .................... 411/272 |
| 2,484,645 | A | * | 10/1949 | Baumle ......................... 411/311 |
| 2,788,046 | A | | 4/1957 | Rosan |
| 3,176,746 | A | * | 4/1965 | Walton .......................... 411/259 |
| 3,186,464 | A | * | 6/1965 | Baumle ......................... 411/168 |
| 3,426,642 | A | * | 2/1969 | Phipard, Jr .................... 411/417 |
| 3,530,760 | A | * | 9/1970 | Lindstrand .................... 411/416 |
| 3,643,722 | A | * | 2/1972 | Oestereicher ................. 411/334 |
| 4,586,861 | A | | 5/1986 | McKewan |
| 5,141,376 | A | * | 8/1992 | Williams et al. ............ 411/387.4 |
| 5,385,439 | A | * | 1/1995 | Hurdle .......................... 411/386 |
| 5,882,160 | A | | 3/1999 | Iwata |
| 6,190,101 | B1 | | 2/2001 | Janitzki |
| 6,447,227 | B1 | * | 9/2002 | Crutchley ........................ 411/69 |
| 6,863,483 | B2 | * | 3/2005 | Koenig et al. ................ 411/311 |

FOREIGN PATENT DOCUMENTS

| | | |
|---|---|---|
| EP | 1391617 A1 | 2/2004 |
| EP | 2224143 A1 | 9/2010 |
| GB | 2074279 A | 10/1981 |
| WO | 02053926 A1 | 7/2002 |

* cited by examiner

*Primary Examiner* — Roberta Delisle
(74) *Attorney, Agent, or Firm* — Gable Gotwals

(57) ABSTRACT

This invention relates to a self-locking screw (16; 116) in which the flanks (18; 118), which are loaded when the screw (16; 116) is screwed, are provided with an arched portion (20; 120).

5 Claims, 4 Drawing Sheets

SELF-LOCKING SCREW

CROSS-REFERENCE TO RELATED APPLICATIONS

This application is the United States National Phase of PCT Patent Application No. DE2011/050049 filed on 24 Nov. 2011, which claims priority to German Patent Application No. 20 2010 015 839.7 filed 26 Nov. 2010, both of which are incorporated herein by reference.

TECHNICAL FIELD

The present invention relates to a self-locking thread which can be used both as an outer thread, for example in screws or bolts, and as an inner thread, for example in nuts.

Self-locking screw connections are in great demand. Securing elements according to the prior art often have chemical additives which pollute the environment and only allow a single securing action. A rescrewing operation with a new securing action is not possible and can be carried out only by using a new screw or nut.

PRIOR ART

Other securing elements from the prior art produce their securing action by increasing the head friction, for example by means of ribs on the workpiece-side lower face of the screw head. However, the counter-position is often mechanically damaged to a great extent. The securing action is further decreased by settlement of the head support, for example as a result under vibrations or owing to temperature fluctuations. Based on this prior art, an object of the present invention is to provide a self-locking thread which neither requires chemical additives, nor can it bring about a plastic deformation of the counter-thread or damage to the head support. According to the invention, the connection is intended to be releasable at any time and to be able to be screwed again at any time with a complete securing action.

SUMMARY OF THE INVENTION

According to the invention, this object is achieved with a self-locking thread in which the flanks which are loaded when the thread is screwed are provided with a protuberance.

It is preferable for the protuberance to extend in each case over only a portion or a plurality of short portions of each thread turn. An excessively powerful clamping effect is thereby prevented, by means of which a rescrewing of the connection would have otherwise been made impossible.

In order to simplify the production, it is preferable for the protuberances to be constructed having a circular-arc-shaped cross-section.

If it is desirable for the self-locking action of the thread to only occur when the screw connection is tightened, it is preferable for the height of the protuberances to be selected such that the protuberances do not yet come into non-positive-locking engagement with the flanks of the opposing thread when the thread is screwed in, but rather only when the thread is tightened. Beforehand, the thread can rotate freely, since the counter-thread provides sufficient play when the height of the protuberances is selected correctly.

According to the invention, however, a clamping action can also be produced before the screw or nut reaches a stop, for example in order to provide a movable but non-releasable connection. In such a case, it is preferable, at a specific location of the thread, to provide each of the two flanks of the thread with a protuberance. The clamping action is then sure to occur, even when no pretensioning is built up by the tightening of the thread. In this manner, a counter-nut can be dispensed with.

In order to prevent premature clamping of the thread, the protuberances are preferably constructed so as to taper in the screwing-in direction of the thread with a rounded tip.

BRIEF DESCRIPTION OF THE DRAWINGS

The present invention is explained in greater detail below with reference to the embodiments illustrated in the drawings, in which.

BEST METHOD FOR CARRYING OUT THE INVENTION

Figure 1:
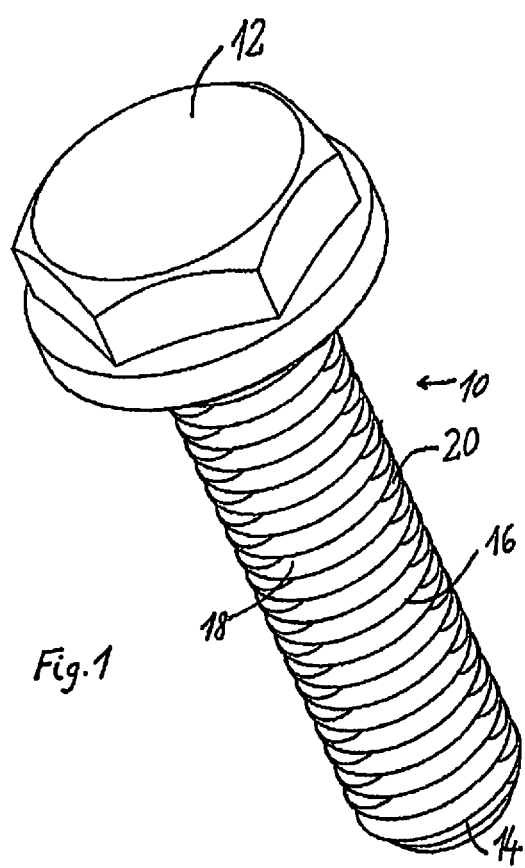
FIG. 1 shows a screw having an outer thread according to the invention.

FIG. 1 is a three-dimensional illustration of a screw 10 having a head 12 and a shaft 14 having an outer thread 16 according to the invention. According to the invention, the flanks of the thread which receive the forces when the screw is tightened, that is to say, in the present case the flanks 18 of the outer thread 16 directed upwards in FIG. 1 are provided with protuberances 20 which extend over a limited curved portion of the respective thread turns into the thread turn. In the present case, these protuberances 20 are each spaced apart by approximately 120°, that is to say, there are three protuberances 20 on a winding revolution. The protuberances cover a total of approximately ⅓ of the entire winding revolution. They are constructed so as to acutely taper in a rotation direction with a rounded end and so as to arch in a circular-arc shape in cross-section.

Figure 2:
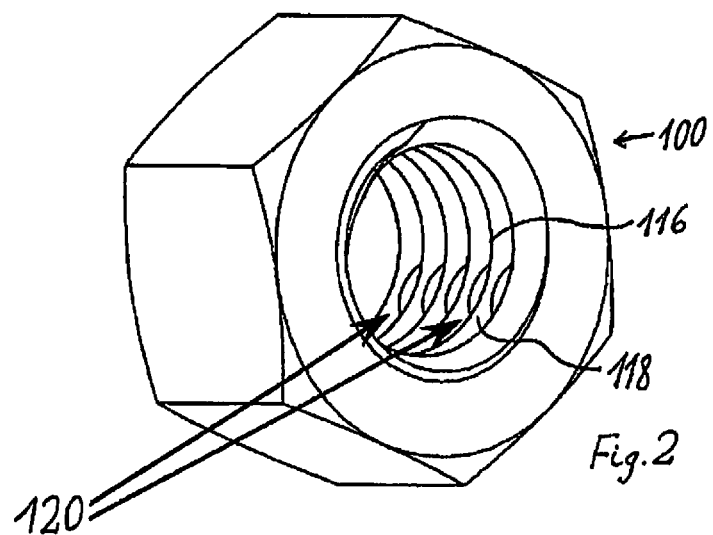
FIG. 2 shows a nut having an inner thread according to the invention.

FIG. 2 shows a nut 100 according to the invention with an inner thread 116. In this instance, the flanks 118 which are loaded with force when the nut is tightened also carry protuberances 120 which in this case also each extend over only a short portion of an entire thread revolution. In this embodiment, only two mutually opposed protuberances are provided in a thread revolution, and in this instance cover less than ⅛ of the entire thread revolution.

Figure 3:
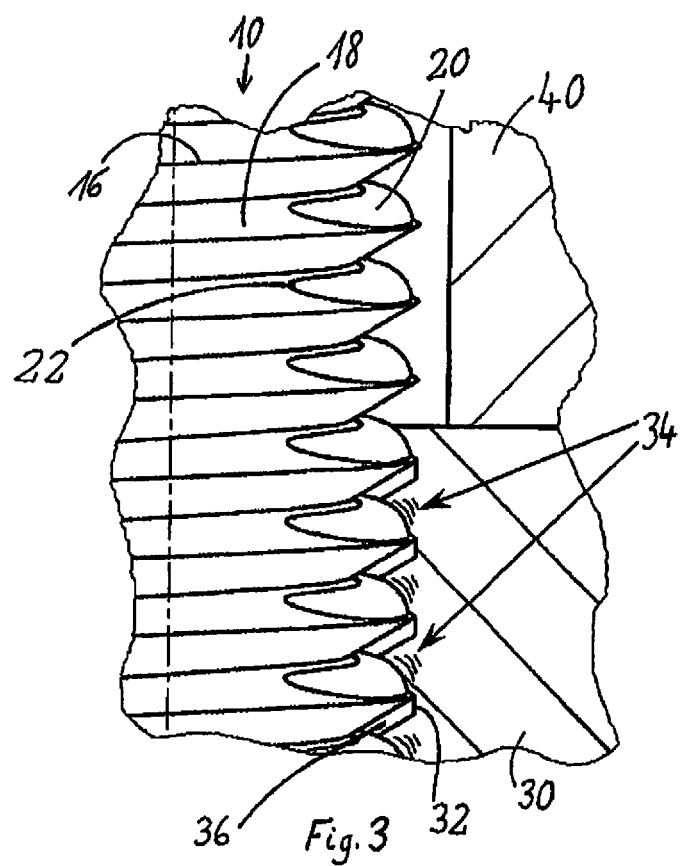
FIG. 3 shows a screw connection having an outer thread according to the invention in an inner thread of a workpiece.

FIG. 3 shows the state in which a screw 10 having an outer thread 16 according to the invention is screwed into a workpiece 30 and tightened, there being located between the head (not illustrated) of the screw 10 and the workpiece 30 another workpiece 40 which is secured by means of the screw 10. In this detailed illustration, it can be seen particularly well how the protuberances 20 are arranged on the flanks 18 of the outer thread 16 that receive the load. In this instance, the precise configuration of the protuberances 20 can be seen particularly well. They have a circular-arc-shaped cross-section and taper at least in the screwing-in direction of the screw 10 and terminate with a rounded tip 22.

In the lower region of FIG. 3, which shows the state after the screw 10 has been tightened in the workpiece 30, it can be seen very well how a deformation of the force-absorbing flanks of the counter thread 32 in the workpiece 30 occurs owing to the tightening force.

As long as the screw is still being screwed in, that is, is not applying any pretensioning forces to the second workpiece 40, the play between the threads 16 and 32 is sufficient for the screw 10 to be able to rotate freely without the protuberances 20 coming into engagement at the opposing flanks of the thread 32. However, when the screw 10 has then been tightened, as illustrated in FIG. 3, the upper flanks 18 of the thread 16 of the screw 10 in FIG. 3 are pressed against the lower flanks of the counter-thread 32 in the workpiece 30 in FIG. 3. A corresponding deformation is thereby caused in the workpiece 30 which deformation, according to the invention, is only a resilient and not a plastic deformation of the regions of the downwardly directed flanks of the counter thread 32 opposite the protuberances 20 in FIG. 3. The corresponding resilient deformation is indicated by the tension lines 34 in the workpiece 30. The clearance 36, which enables the easy screwing-in of the screw thread 16 into the inner thread 32 of the workpiece 30 has now been moved completely downwards by the tightening of the screw 10.

Figure 4:
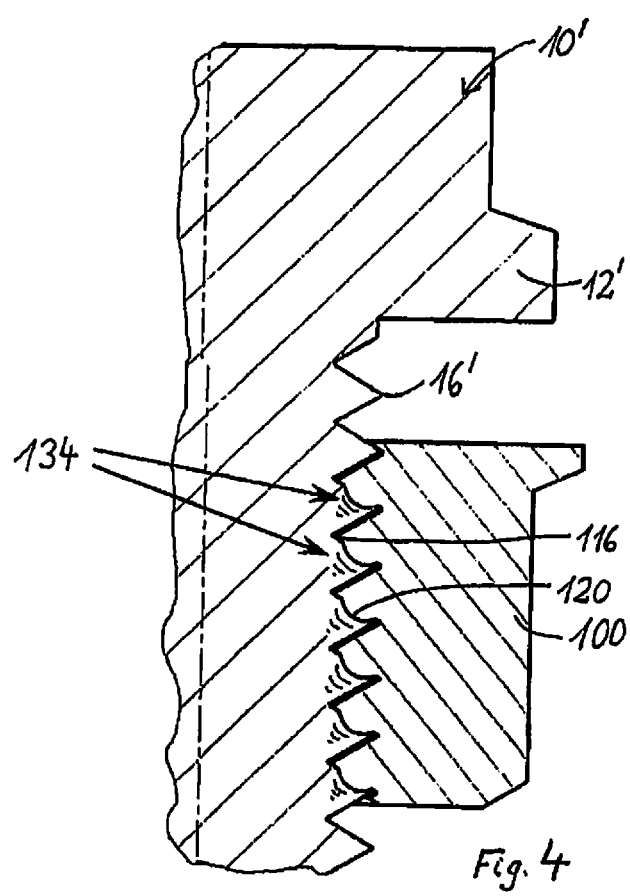
FIG. 4 shows a screw connection of a nut having an inner thread according to the invention with a commercially available screw.

FIG. 4 shows the screw connection of a nut 100 according to the invention with a commercially available screw 10'. The workpiece clamped between the head 12 of the screw 10' and the nut 100 is not illustrated in order to simplify the drawings. However, the tightened state of the screw connection is shown.

In this drawing, both the screw 10' and the nut 100 are each illustrated in a cross-section. It can clearly be seen how the protuberances 120 on the thread turns of the nut thread 116 bring about a resilient deformation of the flanks of the screw thread 16' which are in this instance force-loaded. The corresponding resilient deformation is indicated by the tension lines 134.

As explained above with reference to the drawings, therefore, the securing of the self-locking thread according to the invention is therefore carried out when the corresponding screw connection is tightened and the corresponding pretensioning force is consequently applied by means of partial resilient deformation of the flanks of the counter-thread. Owing to this resilient deformation, a spring effect is produced at the force-loaded thread flank of the counter-thread. Consequently, the screw connection according to the invention is secured against being released by means of distortion.

The protuberances 20 according to the invention settle resiliently in the counter-thread. When the connection is released, an additional release torque must necessarily be overcome, which is produced by means of the resilient settlement of the protuberances 20 in the counter-thread. This "resilient toothing effect" ensures that, when the connection is released, there is no damage to the counter-thread. Consequently, the connection can be rescrewed at any time and also released and screwed again several times, without new components having to be used.

Advantageously, therefore, the self-securing thread described here secures a screw connection in such a manner that no chemical additives are required, and no permanent plastic deformation of the threads or damage to the head support occur. The connection can be released at any time and can be rescrewed at any time with a complete securing effect.

The principle of securing according to the invention is therefore based on the resilient deformability of the flanks of the counter-thread. The self-locking thread according to the invention has, according to the invention, partially or depending on the application, specially constructed protuberances 20 over the complete length of the thread.

Those protuberances may be applied, depending on the load to be anticipated, by the pretensioning forces when the screw connection is tightened, either on the upper side or on the lower side of the respective thread. If a thread is desired which secures in a self-locking manner, at a specific screwing-in depth regardless of the pretensioning force, protuberances may be applied on both thread flanks in the corresponding region of the thread. These then act counter to each other and require no pretensioning force during tightening in order to clamp. In this manner, loose screw connections, for example of components which are intended to remain movable, can also be secured against being rotated open. This solution according to the invention therefore makes the locking of two nuts superfluous.

According to the invention, the protuberances 20 are constructed in such a manner that they do not cause any permanent mechanical deformation in the counter-thread when the thread is screwed in. If the thread is intended to be secured only after the screw connection is tightened by the pretensioning force, the height of the protuberances 20 is intended to be constructed in such a manner that screwing in as far as the head support is possible without additional torque.

The production of the threads which are provided according to the invention with protuberances 20, 120 is unproblematic nowadays, since threads are currently generally milled or rolled. Accordingly, corresponding recesses for the protuberances 20 must be provided only once in the milling or rolling tools. Consequently, these protuberances can also be produced when the threads are milled or rolled without any additional processing complexity.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A self-locking thread (16; 116) to be screwed into an opposing thread, said self-locking thread comprising:
flanks (18; 118), which are loaded when the thread (16; 116) is screwed, provided with at least one protuberance (20; 120) having a height selected such that the protuberance does not yet come into locking engagement with the flanks of the opposing thread when the self-locking thread is screwed in, and wherein the protuberances (20; 120) are constructed so as to taper in a screwing-in direction of the thread with a rounded tip (22), but only when the threads are tightened, the at least one protuberance extending only into turns of the thread and not beyond the thread's outer diameter, causing a temporary deformation in a workpiece.

2. The self-locking thread (16; 116) according to claim 1, wherein the protuberances (20; 120) extend over only a portion or over a plurality of short portions of each thread turn.

3. The self-locking thread (16; 116) according to claim 1, wherein the protuberances (20; 120) have a circular-arc-shaped cross-section.

4. The self-locking thread (16; 116) according to claim 1, wherein at a specific location of the thread, each of two flanks of the thread is provided with a protuberance.

5. A self-locking thread for screwing into an opposing thread, said self-locking thread comprising:
flanks being loaded when the self-locking thread is screwed and having at least one protuberance extending only into thread turns of the self-locking threads, the at least one protuberance having a height selected to be lockably engagable with the opposing thread only when tightened to cause a temporary resilient deformation in a workpiece.

* * * * *